US009043103B2

(12) United States Patent
Mori et al.

(10) Patent No.: US 9,043,103 B2
(45) Date of Patent: May 26, 2015

(54) DOG CLUTCH CONTROL APPARATUS FOR AUTOMATED TRANSMISSION

(71) Applicant: Aisin Seiki Kabushiki Kaisha, Kariya-shi (JP)

(72) Inventors: Kyosuke Mori, Kariya (JP); Masahiko Komura, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/151,041

(22) Filed: Jan. 9, 2014

(65) Prior Publication Data

US 2014/0214293 A1 Jul. 31, 2014

(30) Foreign Application Priority Data

Jan. 31, 2013 (JP) ................................ 2013-017262

(51) Int. Cl.
*F16H 61/68* (2006.01)
*F16H 63/30* (2006.01)
*F16H 61/04* (2006.01)
*F16H 61/28* (2006.01)
*F16H 61/684* (2006.01)
*F16H 63/50* (2006.01)

(52) U.S. Cl.
CPC ...... *F16H 63/304* (2013.01); *F16H 2061/0474* (2013.01); *F16D 2500/50615* (2013.01); *F16H 2063/3093* (2013.01); *Y02T 10/6221* (2013.01); *Y02T 10/6286* (2013.01); *F16H 2061/2823* (2013.01); *F16H 61/0403* (2013.01); *F16H 61/684* (2013.01); *F16H 63/502* (2013.01); *F16H 2063/3063* (2013.01); *F16H 2061/0422* (2013.01); *F16H 2061/0433* (2013.01)

(58) Field of Classification Search
USPC .................................... 701/54, 67; 477/5, 109
See application file for complete search history.

(56) References Cited

U.S. PATENT DOCUMENTS

| 5,487,004 | A | 1/1996 | Amsallen |
| 2008/0009379 | A1* | 1/2008 | Steinwender ..................... 475/5 |
| 2011/0054745 | A1* | 3/2011 | Sato et al. ........................ 701/54 |
| 2011/0307150 | A1* | 12/2011 | Jiang et al. ...................... 701/54 |
| 2013/0096789 | A1* | 4/2013 | McDonnell et al. ............ 701/54 |

FOREIGN PATENT DOCUMENTS

JP 7-167276 7/1995

* cited by examiner

*Primary Examiner* — Edwin A Young
(74) *Attorney, Agent, or Firm* — Oblon, McClelland, Maier & Neustadt, L.L.P.

(57) ABSTRACT

A dog clutch control apparatus for an automated transmission includes a rotary shaft, plural dog clutch mechanisms, each of the dog clutch mechanisms including a clutch ring, a clutch hub arranged next to the clutch ring, a sleeve fitted with the clutch hub, a dog clutch portion which is provided at the clutch ring and selectively meshes with a spline formed at the sleeve, an axial driving device for moving the sleeve, the dog clutch control apparatus includes a disengagement detecting portion for detecting disengagement before the sleeve reaches a neutral position and a control apparatus for controlling operation of the axial driving device, wherein in a case where the disengagement is detected at a time of shifting operation, the control apparatus starts a shift-related control.

4 Claims, 13 Drawing Sheets

F I G. 14
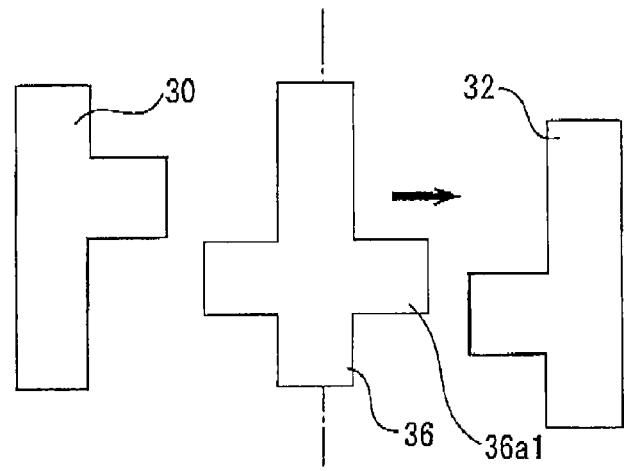
F I G. 15
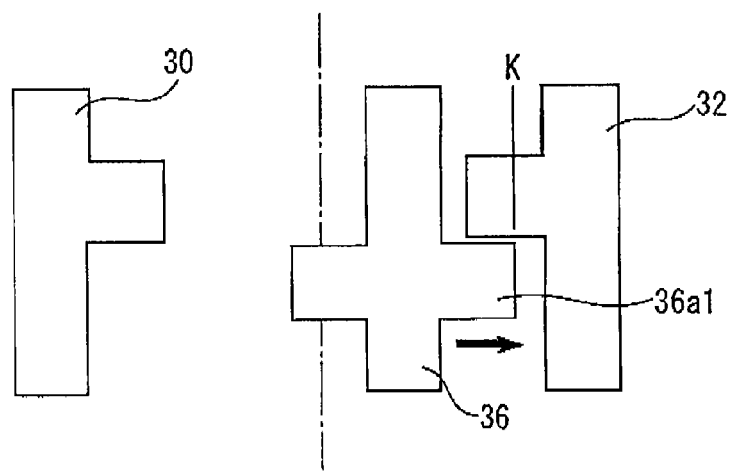

DOG CLUTCH CONTROL APPARATUS FOR AUTOMATED TRANSMISSION

CROSS REFERENCE TO RELATED APPLICATIONS

This application is based on and claims priority under 35 U.S.C. §119 to Japanese Patent Application 2013-017262, filed on Jan. 31, 2013, the entire content of which is incorporated herein by reference.

TECHNICAL FIELD

This disclosure generally relates to a dog clutch control apparatus for an automated transmission.

BACKGROUND DISCUSSION

Conventionally, a powertrain of a vehicle includes a transmission which changes torque and/or the number of rotations of a driving apparatus including, for example, an engine and/or an electric motor, which is used for driving a driving wheel, so that the torque and/or rotations are transmitted to the driving wheel according to running conditions of the vehicle. There are some types of transmissions including, for example, a normally-meshed type transmission. A known normally-meshed type transmission includes plural idler gears, each of which meshes with a rotary shaft connected to the driving wheel to be rotatable relative to the rotary shaft and not to be movable in a direction of a rotational axis, and plural gears, which are provided around a periphery of a counter shaft arranged to be parallel to the rotary shaft. The idler gears and the gears normally mesh with each other. According to the known normally-engaged type transmission, a sleeve is spline-fitted to the rotary shaft to be movable in the direction of the rotational axis, and the sleeve is arranged side by side with the idler gear. Engaging teeth (the spline), which are provided at a joining surface of the sleeve which is joined to the idler gear, are brought to be engaged with engaged teeth (dog clutch teeth), which are provided at a joined surface of the idler gear. Thus, the idler gear engaged with the sleeve and the rotary shaft rotate integrally with each other. As the idler gear which rotates integrally with the rotary shaft and the gear of the counter shaft which meshes with the idler gear rotate in association with each other, torque and/or the number of rotations of the rotary shaft is transmitted to the counter shaft. A shifting operation is performed by selecting, from among the plural idler gears which include different numbers of teeth to each other, the idler gear that is to be rotated integrally with the rotary shaft and by bringing the sleeve into engagement with the selected idler gear.

According to the known transmission, a shift instruction is present at a time of a shifting operation, however, the shifting operation is actually started thereafter and therefore time lag is generated. At the shifting operation, for example, an up-shift operation, the gear (spline) arranged at an input shaft-side is engaged with the gear (the dog clutch teeth) arranged at an output shaft when a rotational speed of the gear of the input shaft-side substantially coincides with a rotational speed of the gear of the output shaft. The gear arranged at the output shaft includes a high gear ratio and rotates at a low rotational speed in accordance with rotations of vehicle wheels. Accordingly, after the shifting operation starts, engine torque needs to be controlled to be reduced and/or a pressing torque of the clutch needs to be controlled, for example. However, these controls are executed in accordance with an actual start of the shifting operation, and therefore it is important at which point of time the start of the shifting operation is determined. According to disclosure related to JPH7-167276A (hereinafter referred to as Patent reference 1), the number of rotations of an input shaft of an automated transmission and the number of rotations of an output shaft of the transmission are obtained, and a gear ratio is calculated from the two rotational speeds. At a time point when change in a value of the gear ratio reaches a predetermined threshold, determination is made that the shifting operation has actually started, and the controls, which are to be executed after the start of the shifting operation, are executed.

However, according to a shift control method described in Patent reference 1, it is determined whether or not the shifting operation has actually started after the predetermined change occurs in the gear ratio value. The gear ratio is a ratio of the number of rotations of the input shaft driven by a drive shaft of an engine relative to the number of rotations of the output shaft driven by a rotation of the wheels. At the time of shifting operation, the shifting operation needs to wait to be performed until the number of rotations of the engine decreases. Therefore, the controls which are to be executed after the determination of the start of the shifting operation may be delayed, and as a result, drivability may be deteriorated and/or a gear shift shock may be generated due to the delay of the controls.

A need thus exists for a dog clutch control apparatus for an automated transmission, which is not susceptible to the drawback mentioned above.

SUMMARY

According to an aspect of this disclosure, a dog clutch control apparatus for an automated transmission includes a rotary shaft which is rotatably connected to one of an input shaft of an automated transmission and an output shaft of the automated transmission, and is supported to be rotatable about an axis, a plurality of dog clutch mechanisms which are engageable and disengageable, each of the dog clutch mechanisms includes a clutch ring which is rotatably supported at the rotary shaft and is rotatably connected to the other one of the input shaft and the output shaft at a predetermined gear ratio, each of the dog clutch mechanisms includes a clutch hub which is fixed to the rotary shaft and is arranged next to the clutch ring, each of the dog clutch mechanisms includes a sleeve which is provided with a spline and is fitted with the clutch hub by the spline to be movable in a direction of the axis, each of the dog clutch mechanisms includes a dog clutch portion which is provided at the clutch ring to protrude towards the sleeve and selectively meshes with the spline formed at the sleeve in response to an axial movement of the sleeve, each of the dog clutch mechanisms includes an axial driving device for moving the sleeve in the direction of the axis, a disengagement detecting portion for detecting disengagement of the sleeve from the clutch ring before the sleeve reaches a neutral position from an engaged state in which the sleeve engages with the clutch ring, and a control apparatus for controlling operation of the axial driving device, wherein in a case where the disengagement of the sleeve from the clutch ring is detected by the disengagement detecting portion at a time of shifting operation, the control apparatus starts a shift-related control for engaging the dog clutch mechanism which is engaged at the time of shifting operation.

BRIEF DESCRIPTION OF THE DRAWINGS

The foregoing and additional features and characteristics of this disclosure will become more apparent from the following detailed description considered with the reference to the accompanying drawings, wherein:

FIG. 14 is a view illustrating a state in which the sleeve is at a neutral position according to the embodiment;

FIG. 15 is a view illustrating a state at the time point when the sleeve starts the engagement with a next dog clutch;

DETAILED DESCRIPTION

An embodiment, in which an automated transmission provided with a dog clutch control apparatus for an automated transmission is applied to a vehicle, will be explained with reference to the drawings.

Figure 1:
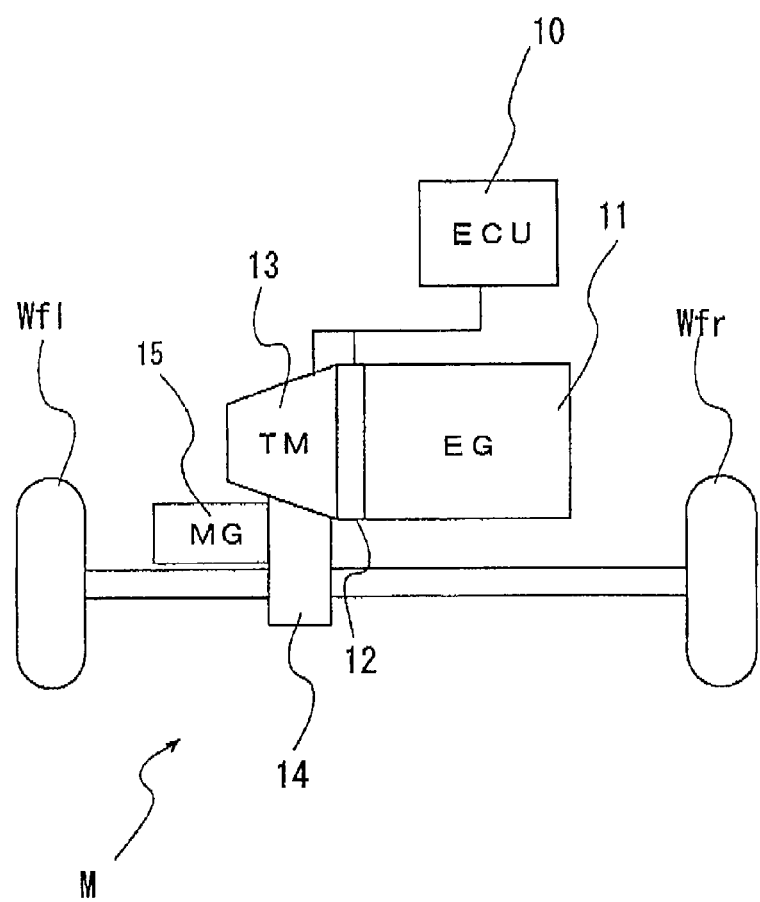
FIG. 1 is a schematic view of a vehicle mounted with an automated transmission including a dog clutch according to an embodiment disclosed here.

As illustrated in FIG. 1, a vehicle M includes a control apparatus (ECU) 10, an engine 11, a clutch 12, an automated transmission 13, a differential apparatus 14, a motor generator 15 and driving wheels (left and right front wheels) Wfl, Wfr. The engine 11 generates drive power by combusting fuel. It is configured so that the drive power of the engine ills transmitted to the driving wheels Wfl, Wfr via the clutch 12, the automated transmission 13 and the differential apparatus 14, that is, the vehicle M is a so-called front wheel drive vehicle.

The clutch 12 is provided between a drive shaft 9 of the engine 11 and an input shaft 24 of the automated transmission 13. The clutch 12 is configured to connect and disconnect between the drive shaft 9 and the input shaft automatically by means of a clutch actuator according to a command of the control apparatus 10. The automated transmission 13 is an AMT (Automated Manual Transmission) which includes therein a dog clutch mechanism that will be described below, and automatically selects, for example, five forward gears and one backward gear.

The differential apparatus 14 includes a final gear and a differential gear, and is formed integrally with the automated transmission 13. The differential apparatus 14 transmits a rotational torque inputted from at least one of an output shaft of the automated transmission 13 and the motor generator 15 to the driving wheels Wfl, Wfr in a manner that differential effects may be obtained.

The motor generator 15 operates as a drive source (a motor) for supplying the rotational torque to the driving wheels Wfl, Wfr and operates also as an electric generator for converting kinetic energy of the vehicle to electric power. The motor generator 15 includes a stator fixedly provided at a case and a rotor provided at an inner circumferential-side relative to the stator so as to be rotatable.

Figure 2:
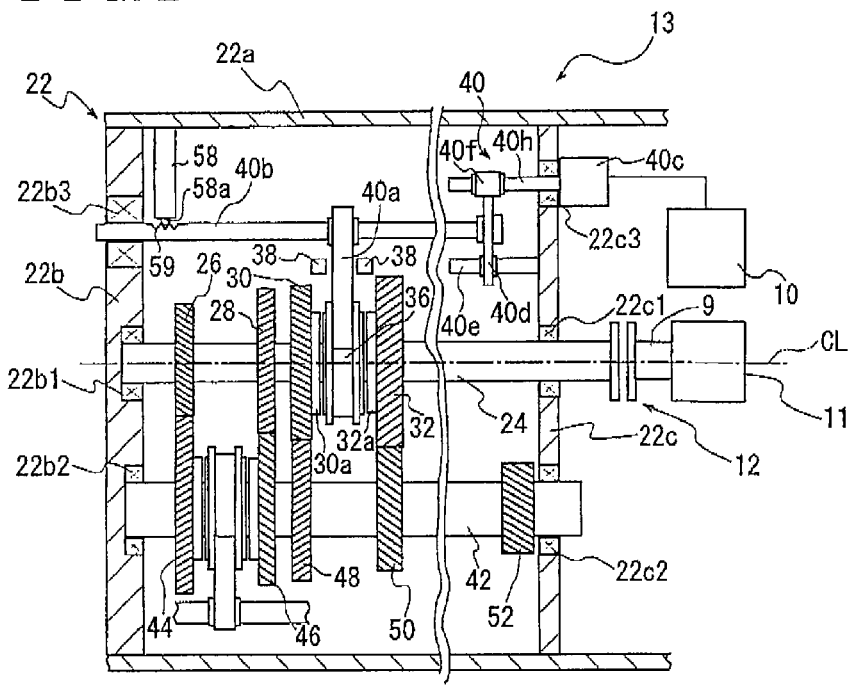
FIG. 2 is a schematic diagram of the automated transmission including the dog clutch according to the embodiment.

As illustrated in FIG. 2 indicating part of a configuration of the automated transmission 13, the automated transmission 13 includes a casing 22, the input shaft (i.e., a rotary shaft) 24, a first input gear 26, a second input gear 28, a third clutch ring (a third input gear) 30, a fourth clutch ring (a fourth input gear) 32, a clutch hub (i.e., a hub) 34, a sleeve 36, a stroke position sensor 38 (which corresponds to a disengagement detecting portion), an axial driving device 40, an output shaft 42, a first clutch ring (a first output gear) 44, a second clutch ring (a second output gear) 46, a third output gear 48 and a fourth output gear 50. A first dog clutch mechanism (i.e., a dog clutch mechanism) is formed by, for example, the first clutch ring (the first output gear) 44, the second clutch ring (the second output gear) 46, the clutch hub (the hub) 34, the sleeve 36 and an axial driving device. A second dog clutch mechanism (i.e., the dog clutch mechanism) is formed by, for example, the third clutch ring (the third input gear) 30, the fourth clutch ring (the fourth input gear) 32, the clutch hub (the hub) 34, the sleeve 36, the stroke position sensor 38 and the axial driving device 40. The dog clutch control apparatus for the automated transmission is formed by, for example, the first and second dog clutch mechanisms and the control apparatus 10. The first clutch ring 44, the second clutch ring 46, the third clutch ring 30 and the fourth clutch ring 32 serve as the clutch rings of this disclosure.

The casing 22 of the automated transmission 13 includes a main body 22a formed in a substantially closed-end cylindrical configuration, a first wall 22b which corresponds to a bottom wall of the main body 22a and a second wall 22c dividing inside of the main body 22a in the right and left direction when viewed in FIG. 2.

The input shaft 24 is rotatably supported at the casing 22. Specifically, a first end (the left end when viewed in FIG. 2) of the input shaft 24 is supported at the first wall 22b via a bearing 22b1 and a second end side (the right end when viewed in FIG. 2) of the input shaft 24 is supported at the second wall 22c via a bearing 22c1. The second end of the input shaft 24 is rotatably connected to the drive shaft 9 of the engine 11 via the clutch 12. Thus, output of the engine 11 is inputted to the input shaft 24 in a case where the clutch 12 is connected. The input shaft 24 serves as the rotary shaft of this disclosure. The input shaft (rotary shaft) 24 of this disclosure is rotatably connected directly to the input shaft of the automated transmission 13 and is supported to be rotatable about a rotational axis (i.e., an axis) CL.

At the input shaft 24, the first input gear 26, the second input gear 28, the third clutch ring (the third input gear) 30, the fourth clutch ring (the fourth input gear) 32 are provided. The first and second input gears 26 and 28 are fixed to the input shaft 24 by, for example, spline-fitting, so as not to be rotatable relative to the input shaft 24. The third input gear is formed at an outer periphery of the third clutch ring 30 which is supported at the input shaft 24 to be rotatable relative to the input shaft 24. The fourth input gear is formed at an outer periphery of the fourth clutch ring 32 which is supported at the input shaft 24 to be rotatable relative to the input shaft 24. Further, the clutch hub (the hub) 34 is fixed to the input shaft 24 by, for example, spline-fitting so as not to be rotatable relative to the input shaft 24 in a manner that the clutch hub 34 is disposed between the third clutch ring 30 and the fourth clutch ring 32, and in a manner that the clutch hub 34 is arranged next to or adjacent to the third clutch ring 30 and to the fourth clutch ring 32 (refer to FIG. 4). The third input gear (the third clutch ring) 30 meshes with the third output gear which will be described below and the fourth input gear (the fourth clutch ring) 32 meshes with the fourth output gear which will be described below.

The output shaft 42 is provided at the casing 22 to be arranged parallel to the input shaft 24. The output shaft 42 is rotatably supported at the casing 22. Specifically, a first end (the left end when viewed in FIG. 2) of the output shaft 42 is supported at the first wall 22b via a bearing 22b2 and a second end (the right end when viewed in FIG. 2) of the output shaft 42 is supported at the second wall 22c via a bearing 22c2.

At the output shaft 42, the first clutch ring (the first output gear) 44, the second clutch ring (the second output gear) 46, the third output gear 48, the fourth output gear 50 and a fifth output gear 52 are provided. The first clutch ring (the first output gear) 44 meshes with the first input gear 26, and a helical gear meshing with the first input gear 26 is formed at an outer circumferential surface of the first clutch ring 44. The second clutch ring (the second output gear) 46 meshes with the second input gear 28, and a helical gear meshing with the second input gear 28 is formed at an outer circumferential surface of the second clutch ring 46. The third output gear 48 meshes with the third clutch ring (the third input gear) 30, and a helical gear meshing with the third clutch ring (the third input gear) 30 is formed at an outer circumferential surface of the third output gear 48. The fourth output gear 50 meshes with the fourth clutch ring (the fourth input gear) 32, and a helical gear meshing with the fourth clutch ring (the fourth input gear) 32 is formed at an outer circumferential surface of the fourth output gear 50. The fifth output gear 52 meshes with an input gear of the differential apparatus 14, and a helical gear meshing with the input gear of the differential apparatus 14 is formed at an outer circumferential surface of the fifth output gear 52.

The clutch hub (the hub) 34 is fixed to the output shaft 42 by, for example, spline-fitting. The clutch hub 34 is disposed between the first clutch ring 44 and the second clutch ring 46 to be arranged next to or adjacent to the first clutch ring 44 and to the second clutch ring 46. The configurations of the first clutch ring 44, the second clutch ring 46, the clutch hub 34 and the like are identical to those of the third clutch ring 30, the fourth clutch ring 32 and the clutch hub 34 at the input shaft 24, therefore the explanation will be omitted. The third output gear 48, the fourth output gear 50 and the fifth output gear 52 are fixed to the output shaft 42 by, for example, spline-fitting. The drive power of the engine 11 is inputted from the input shaft 24, is transmitted to the output shaft 42, and is finally outputted to the differential apparatus 14 via the fifth output gear 52.

A configuration of the second dog clutch mechanism at the input shaft 24 is identical to that of the first dog clutch mechanism at the output shaft 42, and therefore an explanation will be made on the second dog clutch mechanism at the input shaft 24.

Figure 4:
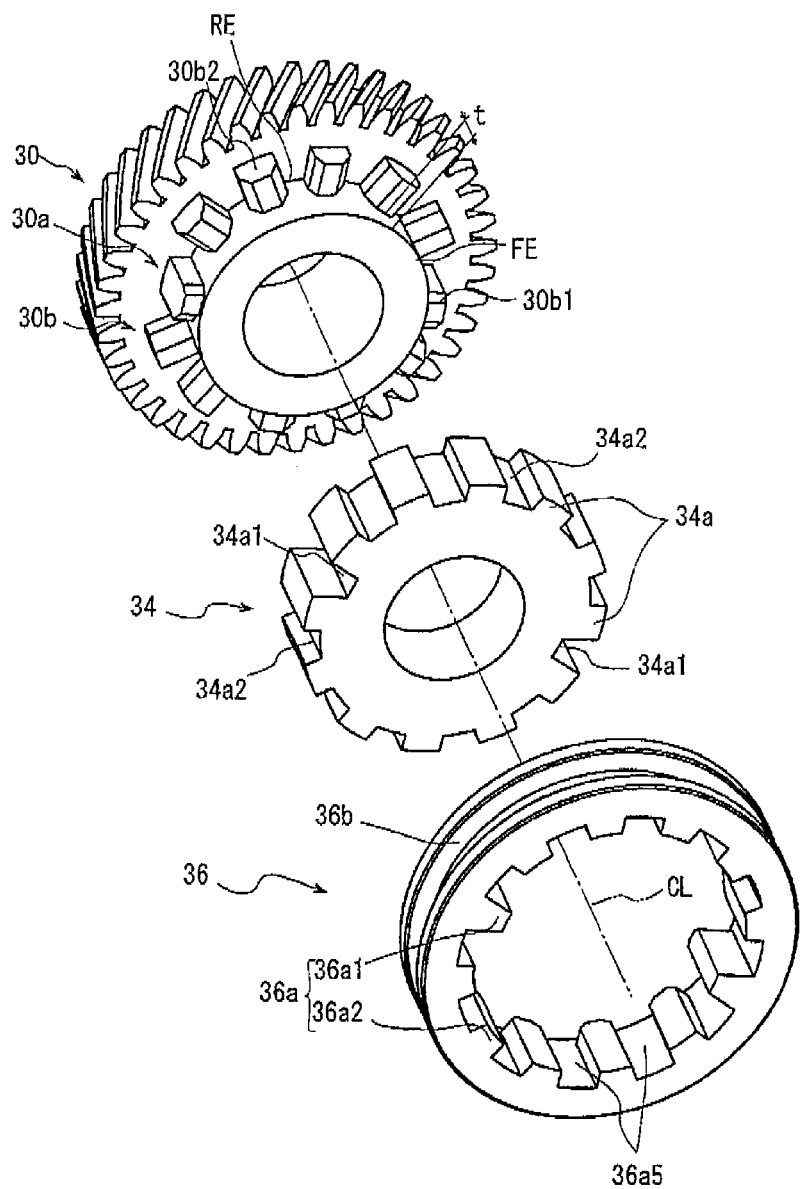
FIG. 4 is an exploded perspective view of a dog clutch mechanism according to the embodiment.
Figure 6:
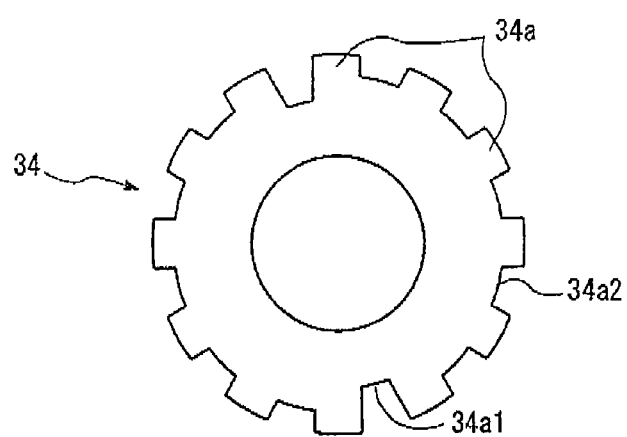
FIG. 6 is a front view of a clutch hub according to the embodiment.

The clutch hub 34 is supported at the input shaft 24 by spline-fitting so as to be rotatable integrally with the input shaft 24. As illustrated in FIGS. 4 and 6, the clutch hub 34 includes an engagement hole which is spline-fitted to the input shaft 24. The clutch hub 34 is formed in a flat cylindrical shape and includes spline teeth 34a provided at an outer circumferential surface of the clutch hub 34. For example, twelve of the spline teeth 34a are arranged in a circumferential direction of the clutch hub 34 at a constant pitch. Each of the spline teeth 34a is formed to include the same diameter of an addendum circle. Among the twelve spline teeth 34a, a pair of spline teeth 34a that face each other in a radial direction across a center of the clutch hub 34 is formed to include the same small diameter of a dedendum circle (deep grooves 34a1). Each of the other ten spline teeth 34a is formed to include the same large diameter of a dedendum circle (shallow grooves 34a2) which is slightly larger than the small diameter of the dedendum circle of the pair of spline teeth 34a. Inner teeth 36a (i.e., a spline) of the sleeve 36 are brought in engagement with the spline teeth 34a of the clutch hub 34 to be slidable.

Figure 7:
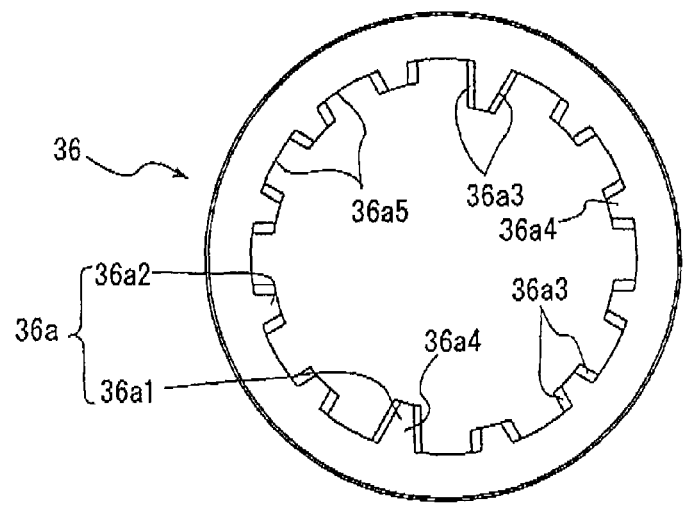
FIG. 7 is a front view of a sleeve according to the embodiment.
Figure 8:
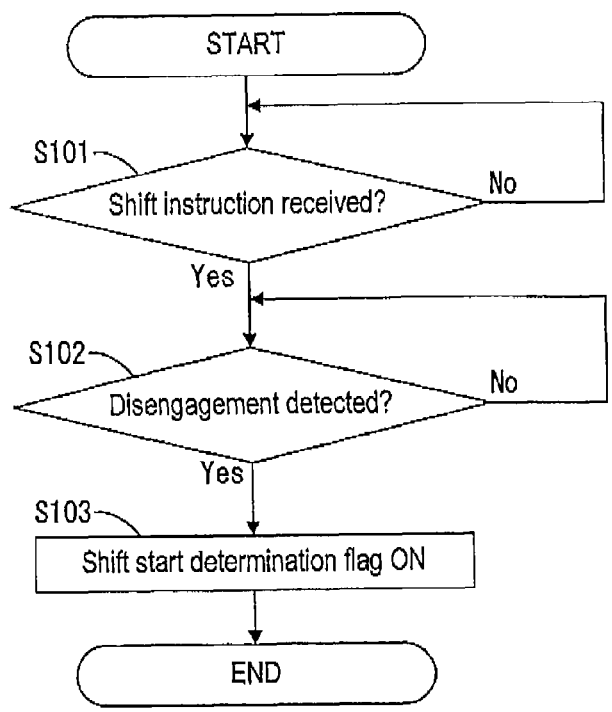
FIG. 8 is a flowchart illustrating a procedure for starting a shift-related control according to the embodiment.

The sleeve 36 is formed in a substantially annular configuration. An outer circumferential groove 36b which slidably meshes with a fork 40a of the axial driving device 40 (refer to FIG. 2) is provided at an outer periphery of the sleeve 36 in a circumferential direction of the sleeve 36. As illustrated in FIGS. 4 and 7, twelve of the inner teeth 36a provided at an inner periphery of the sleeve 36 are arranged in the circumferential direction at a constant pitch. Each of the inner teeth 36a is formed to include the same diameter of a dedendum circle. The inner teeth 36a include high teeth 36a1 and low teeth 36a2, and a height (a length in a radial direction) of each of the high teeth 36a1 differs from a height of each of the low teeth 36a2. The high teeth 36a1, each of which includes a higher height than each of the low teeth 36a2, are formed as a pair on the circumference so as to face each other at a 180 degree interval therebetween. The other inner teeth 36a, that is, the ten low teeth 36a2 include the same height which is shorter than the height of each of the high teeth 36a1. The sleeve 36 includes end surfaces (front end surfaces 36a4) which face the third and fourth clutch rings 30 and 32, respectively. Each of the front end surfaces 36a4, that is, a surface of each of the high teeth 36a1 and the low teeth 36a2 which is at a right angle relative to the rotational axis CL, includes a corner located at a front portion and a rear portion of each of the end surfaces 36a4 in a rotation direction. The corner includes a chamfered surface 36a3 which is formed at 45 degrees angle relative to the rotation direction (refer to FIG. 7). Thus, the corners are prevented from being damaged and/or chipped off due to an impact with dog clutch teeth, which will be described below, of the third and fourth clutch rings 30 and 32. A tooth groove 36a5 is formed between each of the high teeth 36a1 and the low teeth 36a2 adjacent thereto, and between each of the low teeth 36a2 and the low teeth 36a2 adjacent thereto. Clutch front teeth 30b1 and clutch rear teeth 30b2, which will be described below, of the third clutch ring 30 fit or mate with the tooth grooves 36a5. The high teeth 36a1 of the sleeve 36 engage at a position corresponding to the small diameter of the dedendum circle (the deep grooves 34a1) of the clutch hub 34 and the low teeth 36a2 of the sleeve 36 engage at a position corresponding to the slightly large diameter of the dedendum circle (the shallow grooves 34a2) of the clutch hub 34.

At the input shaft 24, the third clutch ring 30 including a third dog clutch portion 30a (i.e., a dog clutch portion) and the fourth clutch ring 32 including a fourth dog clutch portion 32a (i.e., the dog clutch portion) are provided to be adjacent to the clutch hub 34 in the direction of the rotational axis CL, that is, the third clutch ring 30 and the fourth clutch ring 32 are arranged at the respective sides of the clutch hub 34. The third clutch ring 30 and the fourth clutch ring 32 are formed to be substantially symmetrical to each other relative to the clutch hub 34 disposed therebetween, therefore the explanation will be made on the third clutch ring 30.

Figure 5:
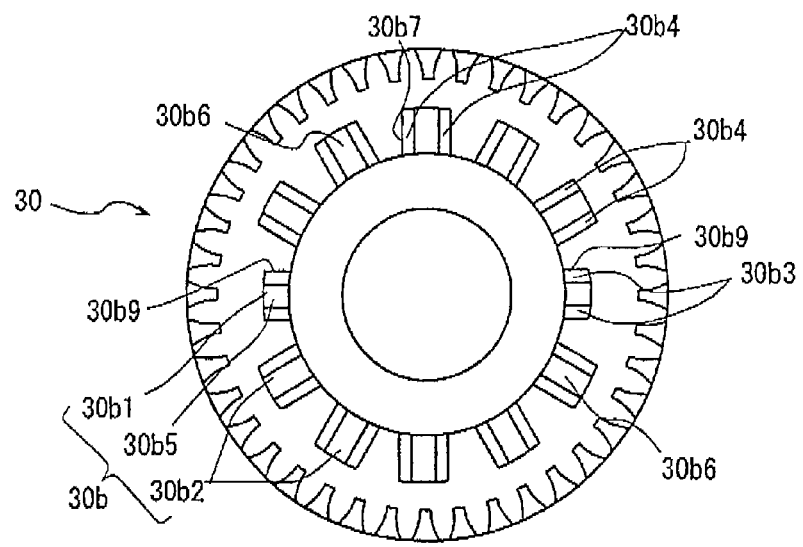
FIG. 5 is a front view of a clutch ring according to the embodiment.

As illustrated in FIGS. 4 and 5, the third clutch ring 30 is provided at the input shaft 24 via a bearing so as to be rotatable relative to the input shaft 24 and so as not to be relatively movable in a direction of the rotational axis CL relative to the input shaft 24. The third input gear provided at an outer circumferential surface of the third clutch ring 30 forms an idler gear which is rotatable relative to the input shaft 24. The third dog clutch portion 30a is formed in a ring shape and is provided at a surface (a meshing portion or a mating portion) of the third clutch ring 30. The surface, at which the third dog clutch portion 30a is provided, faces the clutch hub 34. Plural dog clutch teeth 30b mesh with the inner teeth 36a of the sleeve 36 are provided at an outer periphery of the third dog clutch portion 30a. The dog clutch teeth 30b include two kinds of clutch teeth having different heights or depths from each other, that is, the clutch front tooth 30b1 and the clutch rear tooth 30b2. In addition, the dog clutch teeth 30b are arranged in a circumferential direction of the third clutch ring 30 at a constant pitch. Each of the dog clutch teeth 30b is formed to include the same diameter of a dedendum circle. The clutch front tooth 30b1 is formed at two positions as a pair. That is, one of the positions of the clutch front teeth 30b1 is rotated from the other position by 180 degrees in the circumferential direction. The clutch front teeth 30b1 are formed in such a manner that an outer diameter of an addendum circle of the clutch front teeth 30b1 is larger than an inner diameter of an addendum circle of the high teeth 36a1 of the sleeve 36 and is smaller than an inner diameter of an addendum circle of the low teeth 36a2 of the sleeve 36. Each of the clutch front teeth 30b1 is formed to be extended in the direction of the rotational axis CL from a front end surface FE of the third dog clutch portion 30a, which constitutes the meshing portion, to a rear end position RE of the third dog clutch portion 30a. Each of the clutch front teeth 30b1 includes lateral surfaces 30b9 positioned at a side toward the sleeve 36. Each of the lateral surface 30b9 is provided with a chamfered portion 30b3 inclined by 45 degrees angle relative to a rotation direction of the third clutch ring 30. In a case where the sleeve 36 comes closer to the third clutch ring 30 while rotating relative to the third clutch ring 30, the clutch front teeth 30b1 are brought to engage with the high teeth 36a1 of the sleeve 36 without engaging with the low teeth 36a2. A front end portion of each of the clutch front teeth 30b1 is formed by a front end surface 30b5, which faces towards the sleeve 36, of the clutch front tooth 30b1 and by the chamfered portions 30b3.

As illustrated in FIGS. 4 and 5, five of the clutch rear teeth 30b2 are arranged at a phase position between the two clutch front teeth 30b1 and another five of the clutch rear teeth 30b2 are arranged at a phase position between the two clutch front teeth 30b1, that is, ten of the clutch rear teeth 30b2 are provided in total. The clutch rear teeth 30b2 are formed in such a manner that an outer diameter of an addendum circle of the clutch rear teeth 30b2 is larger than the inner diameter of the addendum circle of the low teeth 36a2 of the sleeve 36. Each of the clutch rear teeth 30b2 is formed to be extended from a position retracted from the front end surface FE, that is, retracted from the side of the sleeve 36, by a predetermined amount t in the direction of the rotational axis CL, to the rear end position RE of the third dog clutch portion 30a. The front end surface FE of the third dog clutch portion 30a corresponds to the meshing portion. Each of the clutch rear teeth 30b2 includes lateral surfaces 30b7 positioned at a side towards the sleeve 36.

Each of the lateral surfaces 30b7 is provided with chamfered portions 30b4 each inclined by 45 degrees angle relative to the rotation direction. In a case where the sleeve 36 comes closer to the third clutch ring 30 while rotating relative to the third clutch ring 30, as the high teeth 36a1 and the low teeth 36a2 move into the position of the third clutch ring 30, the position which is retracted by the predetermined amount t, the clutch rear teeth 30b2 engage with the high teeth 36a1 and the low teeth 36a2 of the sleeve 36. Because the clutch rear teeth 30b2 engage with the high teeth 36a1 and the low teeth 36a2 of the sleeve 36, a large rotational torque is transmitted safely and reliably. A front end portion of each of the clutch rear teeth 30b2 is formed by a front end surface 30b6, which faces towards the sleeve 36, of the clutch rear tooth 30b2 and by the chamfered portions 30b4.

As the stroke position sensor 38, a position sensor from among a variety of sensor types, including, but not limited to, a position sensitive detector or a linear encoder, may be used.

Figure 3:
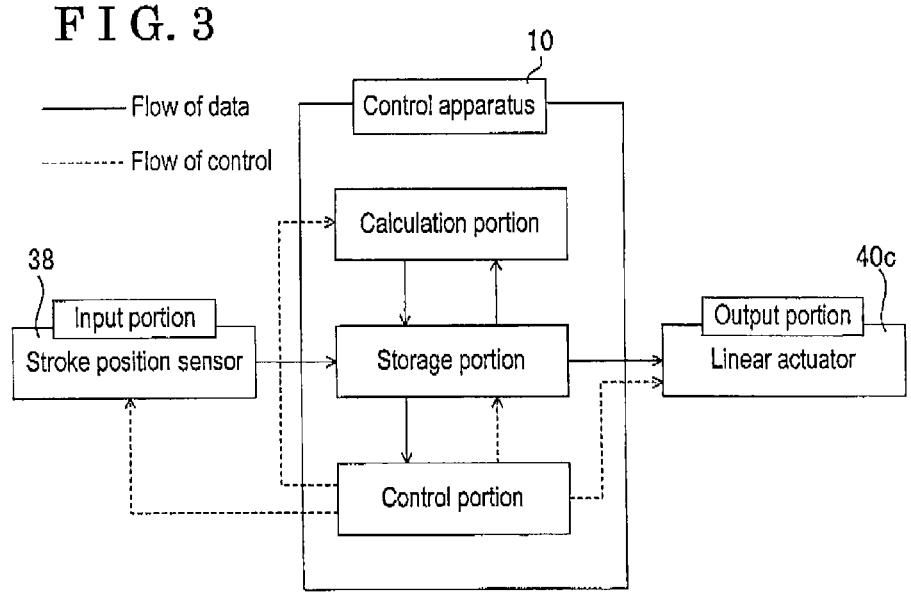
FIG. 3 is a block diagram of a control apparatus according to the embodiment.

The control apparatus 10 includes an integrated control apparatus for controlling an overall running state of the vehicle, an engine ECU for controlling the rotational torque of the engine and the number of rotations of the engine, a transmission ECU (a TM-ECU) for controlling a shifting operation of the automated transmission, a motor generator ECU for controlling rotational torque of the motor generator and a battery ECU for controlling supply of electric power, each of which includes a storage portion, a calculation portion and a control portion. In addition, as illustrated in FIG. 3, the control apparatus (the TM-ECU) 10 controls a thrust load value of a linear actuator driving the axial driving device 40 and the control apparatus 10 controls a moving position of the front end surfaces 36a4 of the high teeth 36a1 on the basis of relative position signals detected by the stroke position sensor 38. The relative position signals indicate a relative position of a distal end (the front end surfaces 36a4 of the high teeth 36a1) of the sleeve 36 relative to the front end surface FE of the third dog clutch portion 30a, a relative position of the distal end of the sleeve 36 relative to the front end portions of the clutch rear teeth 30b2 and a relative position of the distal end of the sleeve 36 relative to the rear end position RE of the third dog clutch portion 30a, respectively.

The axial driving device 40 reciprocates the sleeve 36 along the axial direction, that is, the sleeve 36 performs the axial movement. In a case where the sleeve 36 is pressed or pushed against the third clutch ring 30 or the fourth clutch ring 32 and when a reaction force is applied from the third clutch ring 30 or the fourth clutch ring 32, the axial driving device 40 allows the sleeve 36 to be moved by the reaction force.

The axial driving device 40 includes the fork 40a, a fork shaft 40b and a drive device 40c. A distal end portion of the fork 40a is formed to match a shape of an outer circumferential configuration of the outer circumferential groove 36b of the sleeve 36. A base end portion of the fork 40a is fixed to the fork shaft 40b. The fork shaft 40b is supported at the casing 22 to be slidable along the axial direction. Specifically, a first end (the left end when viewed in FIG. 2) of the fork shaft 40b is supported at the first wall 22b via a bearing 22b3 and a second end side (the right end when viewed in FIG. 2) of the fork shaft 40b is fixed at a bracket 40d. The bracket 40d is slidably supported by a guide member (a rotation lock) 40e which protrudes in the axial direction from the second wall 22c and the bracket 40d is fixed to a nut member 40f, which will be described below, so as not to be rotatable relative thereto. The axial driving device 40 includes, for example, the fork 40a, the fork shaft 40b, a detent mechanism 58 and the drive device 40c (the linear actuator). The fork shaft 40b includes a stopper 58a and the stopper 58a is fitted, by a spring force, into a triangular groove 59 provided at the fork shaft 40b. Accordingly, the fork shaft 40b is configured so that a sliding position of the fork shaft 40b in the direction of the rotational axis is set.

The drive device 40c is a linear drive apparatus of which drive source is the linear actuator. The linear drive apparatus includes, but not limited to, a linear actuator of a ball screw type. The ball screw type linear actuator includes, for example, a casing, a rotor, a driving shaft 40h (a ball screw shaft) and the nut member 40f. The casing is formed in a cylindrical shape and includes plural coils arranged in an inner circumferential direction as a stator. The rotor is arranged to be rotatable relative to the stator, and includes plural north pole magnets and south pole magnets. The north pole magnets and the south pole magnets face the stator with a magnetic gap provided between the magnets and the stator, and are arranged at an outer circumference to alternate with each other. The driving shaft 40h rotates about a rotational axis of the stator integrally with the rotor. The nut member 40f includes a ball nut which threadedly engages with the driving shaft 40h. The driving shaft 40h is screwed into the nut member 40f to be rotatable relative to the nut member 40f via plural balls. The driving shaft 40h is supported at the second wall 22c via a bearing 22c3. As electrification to each of the coils of the stator is controlled, the driving shaft 40h rotates in the forward direction and the backward direction arbitrarily, thereby reciprocating the nut member 40f and the fork shaft 40b, and positioning and retaining the nut member 40f and the fork shaft 40b at arbitrary positions. In addition, because the ball screw shaft is formed to include a long lead, the axial driving device 40 allows the sleeve 36 to be moved by the reaction force which is applied from the third clutch ring 30 or the fourth clutch ring 32 in a case such a reaction force is applied to the sleeve 36.

The linear actuator of the ball screw type is used as the drive device 40c in this embodiment, however, other drive device, including, but not limited to, a solenoid drive device or a hydraulic drive device may be used as long as the drive device allows the sleeve 36 to be moved by the reaction force which is applied from the third clutch ring 30 or the fourth clutch ring 32 in a case where the sleeve 36 is pushed against the third clutch ring 30 or the fourth clutch ring 32.

Next, an operation of the above-described dog clutch apparatus for the automated transmission will be explained with reference to FIGS. 8 to 18. Here, for example, in a case where the sleeve 36 rotates at a high speed and with a small moment of inertia, and the third clutch ring 30 (the third input gear) rotates at a low speed and with a large moment of inertia at an up-shift operation, the speed of the sleeve 36 is reduced. On the other hand, in a case where the sleeve 36 rotates at a low speed and with a small moment of inertia, and the third clutch ring 30 rotates at a high speed and with a large moment of inertia at a down-shift operation, the speed of the sleeve 36 is increased. Hereunder, an operation for reducing the speed of the sleeve 36 in a case where the up-shift operation is performed from the third clutch ring 30 (the third input gear) to the fourth clutch ring (the fourth input gear) will be described on the basis of the flowcharts illustrated in FIGS. 8 and 9.

Figure 10:
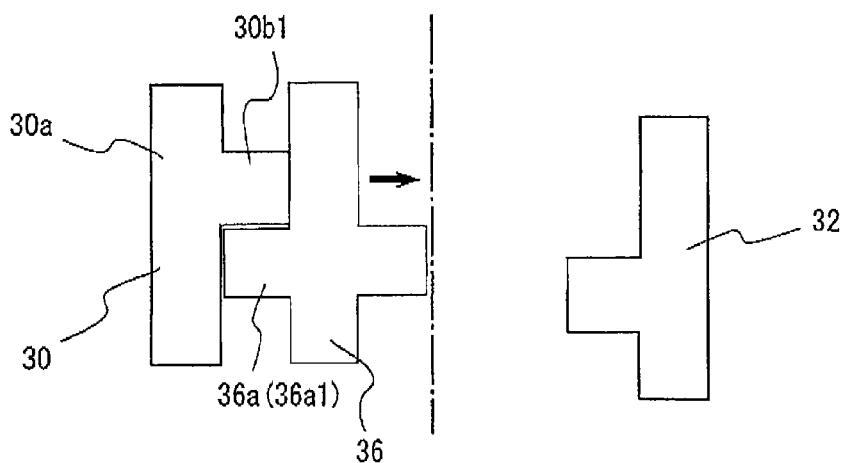
FIG. 10 is a view illustrating a positional relationship of a spline of the sleeve and a dog clutch tooth in an engaged state according to the embodiment.
Figure 11:
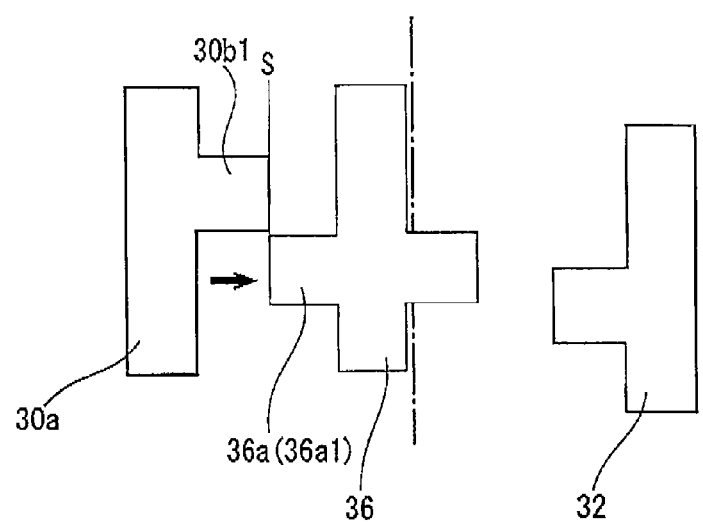
FIG. 11 is a view illustrating the positional relationship of the spline of the sleeve and the dog clutch tooth at a time when the engaged state is released.

First, the inner teeth 36a of the sleeve 36 are in an engaged state where the inner teeth 36a are engaged with the third dog clutch portion 30a of the third clutch ring 30 (refer to FIG. 10). In a case where the running state of the vehicle exceeds, for example, a speed change diagram which indicates a relationship between a throttle opening and a vehicle speed, and it is determined that the control apparatus 10 has received a shift instruction (refer to FIG. 12) for shifting from, for example, the third speed to the fourth speed (Step 101, which will be hereinafter referred to as S101), the control apparatus 10 controls or causes the axial driving device 40 to move the sleeve 36 in a direction of a neutral position at which the engagement between the sleeve 36 and the third clutch ring 30 is disengaged or released. The disengagement detecting portion (the stroke position sensor 38) detects a relative position of the high teeth 36a1 of the sleeve 36 relative to the dog clutch teeth 30b of the third clutch ring 30 as a stroke position (refer to FIG. 12).

Figure 12:
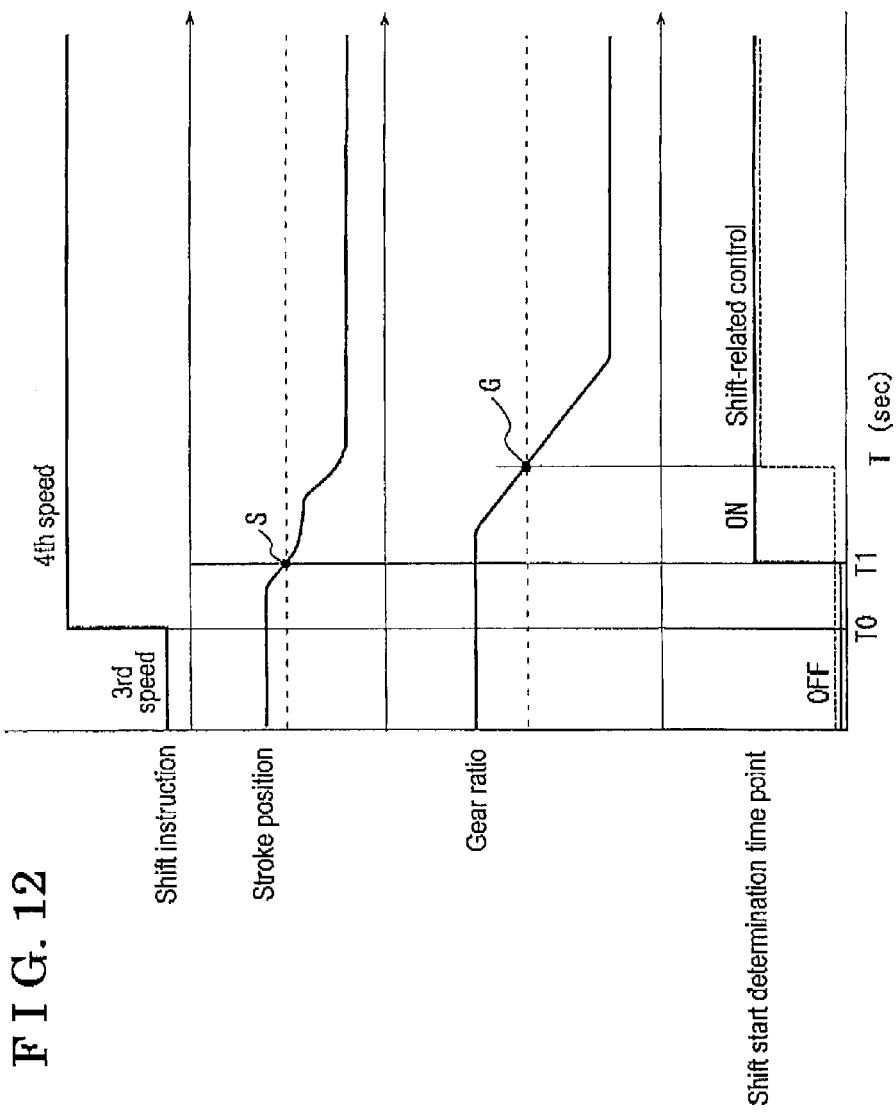
FIG. 12 is a diagram illustrating, in a time chart, a stroke position of the sleeve according to the embodiment.

In FIG. 12, a time point of the shift instruction of the control apparatus 10, the stroke position of the sleeve 36 relative to the third clutch ring 30, a change in a gear ratio of the number of rotations of the input shaft 24 of the automated transmission 13 relative to the number of rotations of the output shaft 42 of the automated transmission 13, and a shift start determination time point are represented on the timing chart.

For example, in a case where the shift instruction to upshift from the third speed to the fourth speed is present at T0 (refer to FIGS. 12 and 13), the control apparatus 10 controls a fuel injection apparatus to reduce driving of the engine 11 and to reduce the rotational torque of the engine. Then, when the rotational torque of the engine is reduced and thus the inner teeth 36a of the sleeve 36 are disengageable from the dog clutch teeth 30b of the third clutch ring 30, the axial driving device 40 starts to move the sleeve 36 from the engaged state in which the inner teeth 36a of the sleeve 36 and the dog clutch teeth 30b of the third clutch ring 30 are engaged with each other to the neutral position at which the engagement between the inner teeth 36a and the dog clutch teeth 30b is released. The engagement is released when the stroke position of the high teeth 36a1 of the sleeve 36 is at a point S (that is, T1 in FIGS. 12 and 13). The stroke position sensor 38 detects a time point at which the point S is reached, as the shift start determination time point. Conventionally, the start of the shifting operation is determined at the time point when the gear ratio, which decrease at a time of shifting operation, reaches a position at which the gear ratio comes to be a predetermined gear ratio, that is, a point G. On the other hand, according to this embodiment, the start of the shifting operation is determined at the point S, and therefore a shift-related control for engaging the next sleeve 36, that is, the sleeve 36 for performing the gear change to the next speed, with the fourth clutch ring 32 is executed at an early stage.

As described above, in a case where the stroke position sensor 38 detects a position at which the high teeth 36a1 disengage from the clutch front tooth 30b1 of the third clutch ring 30 (refer to FIG. 11, the point S in FIG. 12), the stroke position sensor 38 transmits a disengagement signal to the control apparatus 10 (S102).

Figure 9:
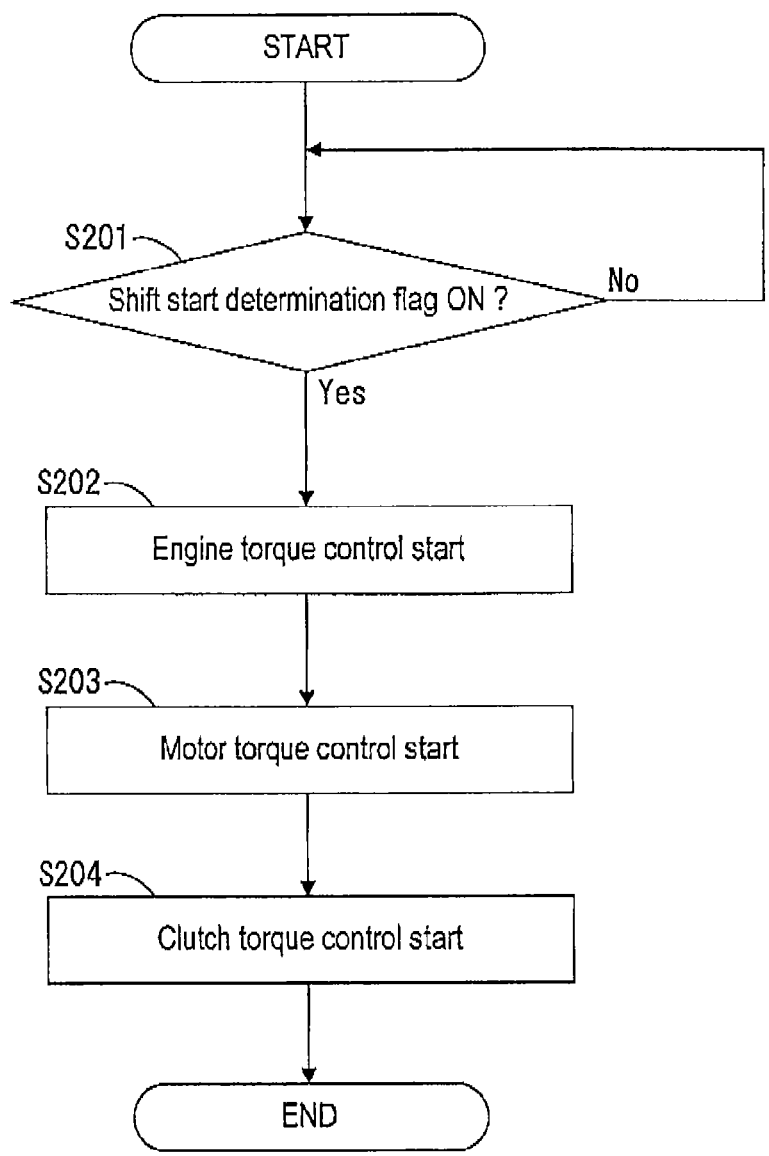
FIG. 9 is a flowchart illustrating the shift-related control.

Upon receiving the disengagement signal, the control apparatus 10 turns on a shift start determination flag (S103), and starts a shift start control (refer to FIG. 9). For example, as the shift start control, the control apparatus 10 controls the rotational torque of the engine, a transfer torque of the clutch and the rotational torque of the motor generator, as will be described below.

First, the control apparatus 10 confirms whether the shift start determination flag is ON (S201). In a case where the shift start determination flag is not ON, the control apparatus 10 repeats the inquiry of whether the shift start determination flag is ON. In a case where it is determined that the shift start determination flag is ON, the control apparatus 10 controls the fuel injection apparatus to stop and the drive of the engine 11 to stop, and thereby controls the rotational torque of the engine to be reduced (start of an engine torque control, S202, T1 in FIG. 13). Accordingly, the drive of the engine 11 stops, and as illustrated at 1 in FIG. 13, the rotational torque of the engine 11 in a positive direction further decreases and then changes to the rotational torque in a negative direction. Because the clutch 12 is in the engaged state, the negative torque, which is a friction torque of the engine 11, is inputted via the clutch 12 to the input shaft 24. As illustrated at 3 in FIG. 13, as the engine 11 stops, the engine rotational speed and the input shaft rotational speed (the number of rotations of the input shaft) decrease. In addition, at the same time as the rotational torque of the engine 11 decreases, the control apparatus 10 starts the control which increases the rotational torque of the motor generator 15 (start of a motor torque control, S203, and 2 in FIG. 13). In consideration of acceleration and deceleration of the vehicle M, the rotational torque of the motor generator 15 is controlled to supplement or compensate a loss of the rotational torque of the engine 11 which is inputted to a ring gear of the differential apparatus 14.

The control apparatus 10 controls the axial driving device 40 to move the sleeve 36 to the neutral position (refer to FIG. 14). The control apparatus 10 drives the clutch actuator and reduces the transfer torque of the clutch 12 to be lower than the transfer torque at a full engagement and to be larger than 0 (4 in FIG. 13). The control apparatus 10 controls the clutch 12 to be in a half-engaged state (start of a clutch torque control, S204, T2 in FIG. 13). Because the input shaft 24 is not rotatably connected to the output shaft 42, rotational moment is generated only at part of the members which rotate integrally with the input shaft 24, that is, the rotational moment is generated at, for example, the input shaft 24, a clutch disc and the dog clutch. Accordingly, even in a case where the clutch 12 in the half-engaged state, the drive shaft 9 of the engine 11 and the input shaft 24 rotate integrally with each other while slippage scarcely occurs at the engagement of the clutch 12. Thus, the rotational speed of the input shaft 24 decreases as the rotational speed of the engine 11 is reduced.

Figure 13:
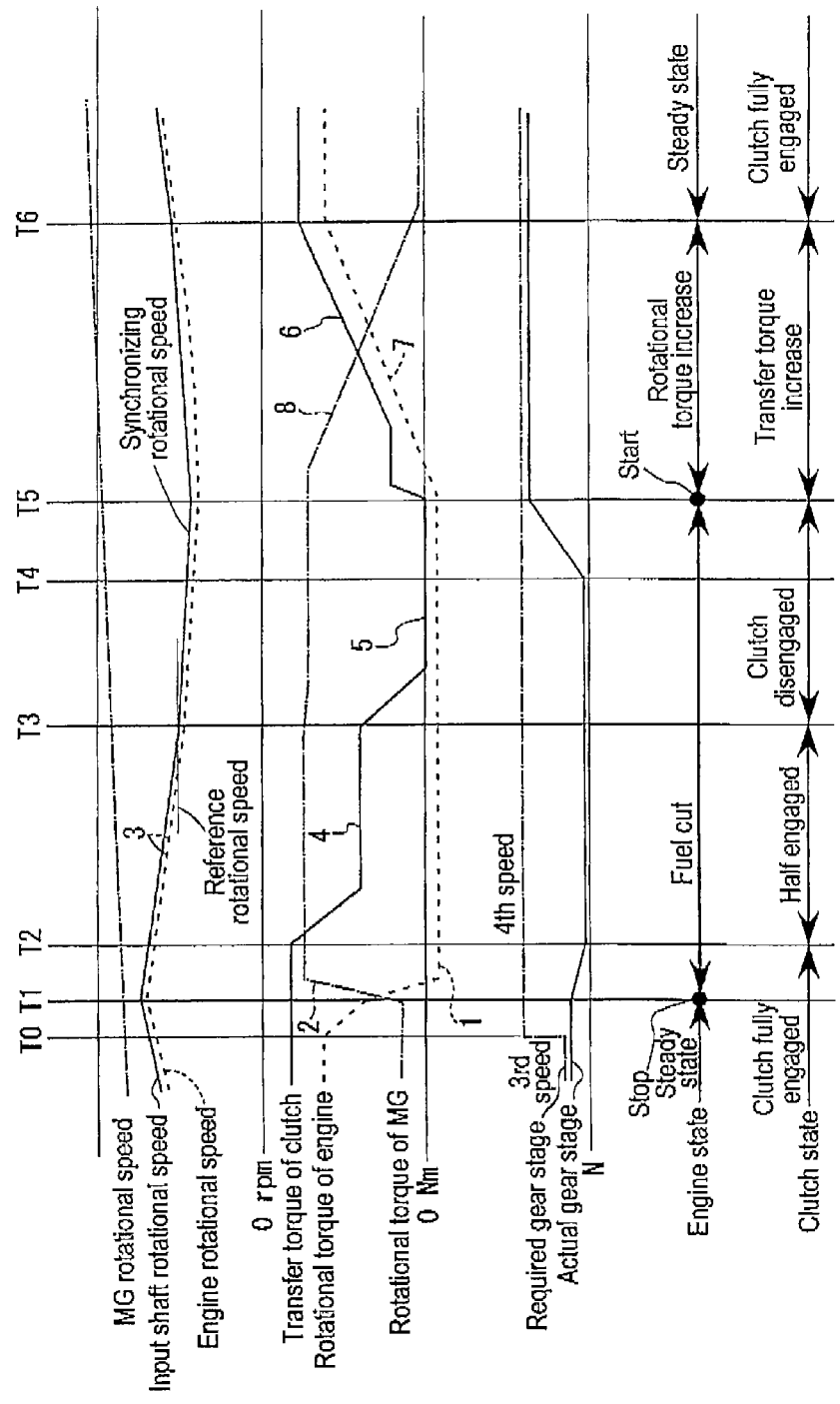
FIG. 13 is a diagram illustrating, in a time chart, the shift-related control.
Figure 16:
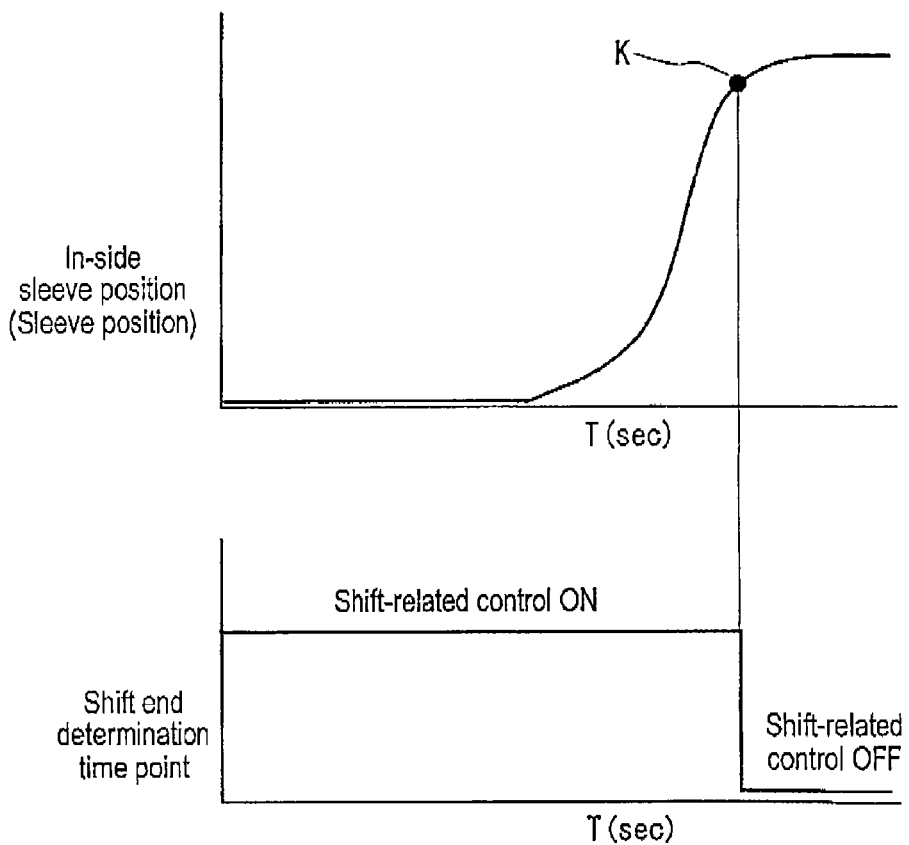
FIG. 16 is a diagram illustrating, by the stroke position of the sleeve, a movement of the sleeve engaging with the next dog clutch.

In a case where the control apparatus 10 determines that the rotational speed of the input shaft 24 has decreased and is lower than a reference rotational speed, the control apparatus 10 controls the transfer torque of the clutch 12 to be 0 (5 in FIG. 13) by driving the clutch actuator, and thus the clutch 12 is disengaged (T3 in FIG. 13).

Figure 17:
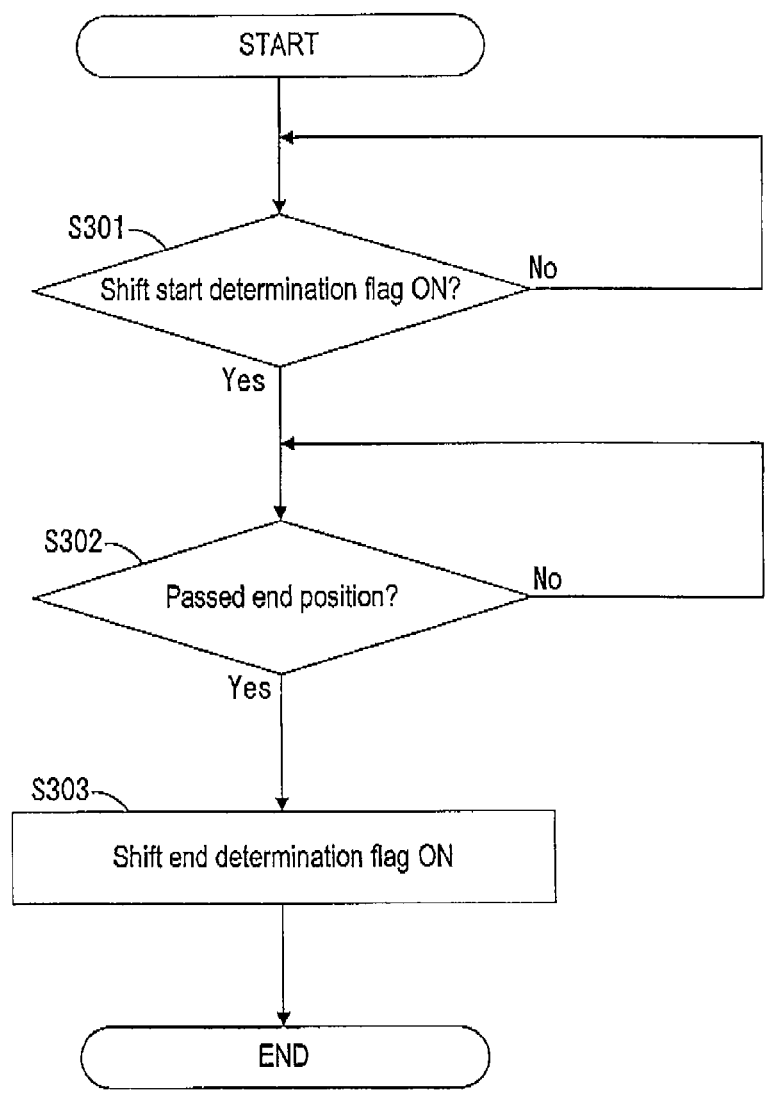
FIG. 17 is a view illustrating a flowchart for executing an end determination of the shift-related control.
Figure 18:
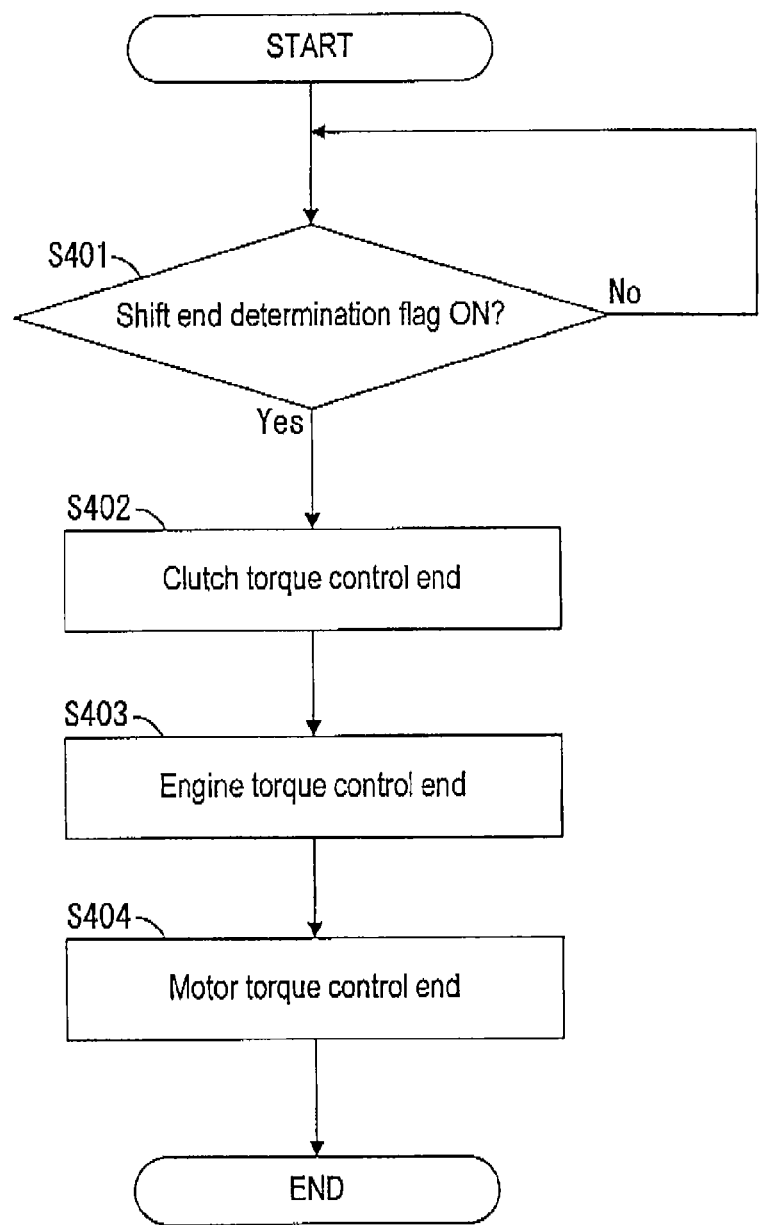
FIG. 18 is a flowchart illustrating end of the shift-related control.

In a case where the control apparatus 10 determines that the rotational seed of the input shaft 24 has decreased to a synchronizing rotational speed, the control apparatus 10 confirms whether the shift start determination flag is ON (FIG. 17, S301). In a case where the shift start determination flag is ON, the control apparatus 10 controls the axial driving device 40 to be driven to operate toward an up-shift-side, and thus starts the engagement of the sleeve 36 with the fourth clutch ring 32 (T4 in FIG. 13). The sleeve 36 moves from the neutral position illustrated in FIG. 14 towards the fourth clutch ring 32 as illustrated in FIG. 15.

It is detected by the stroke position sensor 38 whether or not the high teeth 36a1 (an in-side sleeve), which face the fourth clutch ring 32, of the sleeve 36 have passed a position (a point K, that is, an end position). The point K is a position that is advanced from an end surface of each of front teeth of the fourth clutch ring 32 by a predetermined amount (refer to FIGS. 15 and 16). The end position K is set at the position at which the engagement between the sleeve and the fourth clutch ring 32 is not released even in a case where the rotational torque from, for example, the engine 11 is applied.

In a case where the control apparatus 10 receives a detection signal that indicates that the high teeth 36a1 have passed the end position K (S302), the control apparatus 10 turns a shift end determination flag ON (S303).

In a case where the control apparatus 10 confirms that the shift end determination flag is ON (S401), the control apparatus 10 ends the shift-related control (S402, T5 in FIG. 13). Specifically, the axial driving device 40 pushes the sleeve 36 against the fourth clutch ring 32 and moves the sleeve 36 forward until the high teeth 36a1 of the sleeve 36 come to fully engage with clutch front teeth and clutch rear teeth of the fourth clutch ring 32.

By driving the clutch actuator, the control apparatus 10 controls the transfer torque of the clutch 12 to be increased gradually until the transfer torque at the full engagement is reached (6 in FIG. 13). When the transfer torque at the full engagement is reached, the clutch torque control ends (S402).

In accordance with the increase in the transfer torque of the clutch 12, the control apparatus 10 controls the engine 11 to start and controls the rotational torque of the engine 11 to increase (7 in FIG. 13). At the same time, the control apparatus 10 transmits a control signal to the motor generator 15, and decreases the rotational torque of the motor generator 15 (8 in FIG. 13). Thus, the engine torque control ends (S403) and the motor torque control ends (S404) (T6 in FIG. 13).

In case where the sleeve 36 rotates at a low speed and with a small moment of inertia and the third clutch ring 30 rotates at a high speed with a large moment of inertia, for example, at the down-shift operation, the rotational speed of the sleeve 36 is increased. Thus, the relative rotation, that is, the speed of the relative rotation, between the sleeve 36 and the third clutch ring 30 is in a manner opposite to the up-shift operation as explained above. Accordingly, the tooth groove of the clutch front teeth 30b1 in which the corresponding high tooth 36a1 fits or engages is the tooth groove that is positioned at an opposite side relative to the clutch front tooth 30b1 in the circumferential direction. The other operation is identical to that in the case where the rotational speed of the sleeve 36 is reduced.

As is clear from the above description, according to the dog clutch control apparatus for the automated transmission of this embodiment, in a case where the disengagement is detected by the stroke position sensor 38 at the time of shifting operation, that is, at the speed change, the control apparatus 10 starts the shift-related control, that is, the control related to or associated with the shifting, for engaging the dog clutch mechanism 30, 36, 40 (the third clutch ring 30, the sleeve 36, the axial driving device 40) which is engaged at the time of shifting operation. Accordingly, the shift-related control is started at a time point earlier than a time point when the change occurs in the gear ratio due to the decrease in the number of rotations of the engine at the time of shifting operation. Consequently, the shift-related control is executed without delay, thereby enhancing drivability and preventing a gear shift shock from occurring.

In addition, the engine torque control, which controls the rotational torque of the engine 11, and the clutch torque control, which controls the transfer torque of the clutch 12, are executed without delay at the time shifting operation. Consequently, the drivability may be enhanced and the gear shift shock may be prevented from occurring.

In addition, also on a hybrid vehicle on which the motor generator 15, together with or in addition to the engine 11, is mounted as the drive source, the motor torque control that is necessary to be conducted at the time of shifting operation is executed without delay, thereby preventing a torque loss or torque decrease at the time of shifting operation.

In this embodiment, the explanation is made on a case where the up-shift is performed from the third speed to the fourth speed, however, this embodiment is not limited thereto. This embodiment may be applied to a case where the down-shift is performed from, for example, the second speed to the first speed. Also in a case where the down-shift operation is performed, the shift-related control is started early, thereby enhancing the drivability and preventing the gear shift shock occurring at the shifting operation.

This embodiment is applied to the hybrid vehicle on which the engine and the motor generator are mounted as the drive source, however, this embodiment may be applied to a vehicle whose drive source is only the engine. In this case, as the shift-related control, the motor torque control is not conducted, however, the control of the engine rotational torque needs to be conducted. Thus, a start determination time point at which the start of the shift-related control is determined may be advanced.

In addition, in this embodiment, the dog clutch mechanism is provided with the dog clutch teeth including the two tiers of teeth, that is, the front teeth and the rear teeth. However, this embodiment is not limited thereto and the dog clutch teeth may include one tier of teeth, or three tiers of teeth, that is, the front teeth, the rear teeth, and intermediate teeth provided between the front teeth and the rear teeth.

In this embodiment, the two clutch front teeth are provided on the circumference so as to face each other. However, for example, three or more than three clutch front teeth may be provided on the circumference of the clutch ring to be equally spaced from one another.

In this embodiment, the rotary shaft corresponds to the input shaft 24 of the automated transmission, which is rotatably connected to the output shaft 42 of the engine 11 via the clutch 12, however, the embodiment is not limited thereto. For example, the rotary shaft may correspond to the output shaft transmitting the rotational torque from the automated transmission to a driving wheel-side. Specifically, the automated transmission may include an input shaft connected to an output shaft of an engine via a clutch, a counter shaft which is arranged parallelly to the input shaft and is rotatably connected via transmission gear to the input shaft, a rotational axis which is parallel to the counter shaft, and an output shaft provided with plural idler gears which mesh with the plural transmission gears provided at the counter shaft, wherein the output shaft of the automated transmission may correspond to the rotary shaft. In this case, the moment of inertia is large at the sleeve-side, and the moment of inertia is small at the clutch ring-side (a free state).

In addition, the rotary shaft which is rotatably connected to the input shaft of the automated transmission includes the rotary shaft (the input shaft) which is connected directly to the input shaft as described in this embodiment. The rotary shaft which is rotatably connected to the output shaft of the automated transmission includes the rotary shaft which is connected directly to the output shaft.

This disclosure is not limited to the embodiment which is described above and illustrated in the drawing, but this disclosure may be appropriately changed or modified without departing from the subject matter thereof.

According to the aforementioned embodiment, the dog clutch control apparatus for the automated transmission includes the rotary shaft 24 which is rotatably connected to one of the input shaft 24 of the automated transmission 13 and the output shaft 42 of the automated transmission 13, and is supported to be rotatable about the rotational axis CL, the first dog clutch mechanism 34, 36, 44, 46 and the second dog clutch mechanism 30, 32, 34, 36, 40 each of which is engageable and disengageable, each of the first and second dog clutch mechanisms 30, 32, 34, 36, 38, 40, 44, 46 includes the clutch ring 30, 32, 44, 46 which is rotatably supported at the rotary shaft 24 and is rotatably connected to the other one of the input shaft 24 and the output shaft 42 at the predetermined gear ratio, each of the first and second dog clutch mechanisms 30, 32, 34, 36, 38, 40, 44, 46 includes the clutch hub 34 which is fixed to the rotary shaft 24 and is arranged next to the clutch ring 30, 32, 44, 46, each of the first and second dog clutch mechanisms 30, 32, 34, 36, 38, 40, 44, 46 includes the clutch hub 34 which is fixed to the rotary shaft 24 and is arranged next to the clutch ring 30, 32, 44, 46, each of the first and second dog clutch mechanisms 30, 32, 34, 36, 38, 40, 44, 46 includes the sleeve 36 which is provided with the inner teeth 36a and is fitted with the clutch hub 34 by the inner teeth 36a to be movable in the direction of the rotational axis CL, the first and second dog clutch mechanisms 30, 32, 34, 36, 38, 40, 44, 46 respectively include the third and fourth dog clutch portions 30a, 32a which are provided at the clutch ring 30, 32 respectively to protrude towards the sleeve 36 and selectively mesh with the inner teeth 36a formed at the sleeve 36 in response to the axial movement of the sleeve 36, each of the first and second dog clutch mechanisms 30, 32, 34, 36, 38, 40, 44, 46 includes the axial driving device 40 for moving the sleeve 36 in the direction of the rotational axis CL, the dog clutch control apparatus for the automated transmission includes the stroke position sensor 38 for detecting disengagement of the sleeve 36 from the clutch ring 30, 32, 44, 46 before the sleeve 36 reaches the neutral position from the engaged state in which the sleeve 36 engages with the clutch ring 30, 32, 44, 46, and the control apparatus 10 for controlling the operation of the axial driving device 40, wherein in a case where the disengagement of the sleeve 36 from the clutch ring 30, 32, 44, 46 is detected by the stroke position sensor 38 at the time of shifting operation, the control apparatus 10 starts the shift-related control for engaging the dog clutch mechanism 30, 32, 34, 36, 38, 40, 44, 46 which is engaged at the time of shifting operation.

According to the above described configuration, in a case where the disengagement is detected by the stroke position sensor 38, the control apparatus 10 starts the shift-related control for engaging the dog clutch mechanisms 30, 32, 34, 36, 38, 40, 44, 46 which is engaged at the time of shifting operation. Accordingly, the shift-related control is started at the time point that is earlier than the time point when the change occurs to the gear ratio at shifting operation. Consequently, the shift-related control is executed without delay, thereby enhancing the drivability and preventing the gear shift shock from occurring.

According to the aforementioned embodiment, the shift-related control includes the engine torque control for controlling the rotational torque of the engine 11 which drives the wheels Wfl, Wfr of the vehicle M and the clutch torque control for controlling the transfer torque of the clutch 12.

According to the above described configuration, the engine torque control, which controls the rotational torque of the engine 11, and the clutch torque control, which controls the transfer torque of the clutch 12, are executed without delay at the time of shifting operation. Consequently, the drivability is enhanced and the gear shift shock is prevented from occurring.

According to the aforementioned embodiment, the dog clutch control apparatus further includes the motor generator 15 as the drive source which drives the wheels Wfl, Wfr of the vehicle M, wherein the shift-related control includes the motor torque control for preventing the torque loss from occurring at the time of shifting operation.

According to the above described configuration, on the hybrid vehicle on which the motor generator 15, in addition to the engine 11, is mounted as the drive source, the motor torque control that is necessary to be conducted at the time of shifting operation is executed without delay, thereby preventing the torque loss at the shifting operation.

According to the aforementioned embodiment, the motor torque control controls the rotational torque of the motor generator 15 to be increased at the same time as the rotational torque of the engine 11 decreases.

According to the above described configuration, on the hybrid vehicle on which the motor generator 15, in addition to the engine 11, is mounted as the drive source, the motor torque control that is necessary to be conducted at the time of shifting operation is executed without delay, thereby preventing the torque loss at the shifting operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A dog clutch control apparatus for an automated transmission, comprising:
   a rotary shaft which is rotatably connected to one of an input shaft of an automated transmission and an output shaft of the automated transmission, and is supported to be rotatable about an axis;
   a plurality of dog clutch mechanisms which are engageable and disengageable, each of the dog clutch mechanisms including a clutch ring which is rotatably supported at the rotary shaft and is rotatably connected to the other one of the input shaft and the output shaft at a predetermined gear ratio, each of the dog clutch mechanisms including a clutch hub which is fixed to the rotary shaft and is arranged next to the clutch ring, each of the dog clutch mechanisms including a sleeve which is provided with a spline and is fitted with the clutch hub by the spline to be movable in a direction of the axis, each of the dog clutch mechanisms including a dog clutch portion which is provided at the clutch ring to protrude towards the sleeve and selectively meshes with the spline formed at the sleeve in response to an axial movement of the sleeve, each of the dog clutch mechanisms including an axial driving device for moving the sleeve in the direction of the axis;
   a disengagement detecting portion for detecting disengagement of the sleeve from the clutch ring before the sleeve reaches a neutral position from an engaged state in which the sleeve engages with the clutch ring; and
   a control apparatus for controlling operation of the axial driving device,
   wherein in a case where the disengagement of the sleeve from the clutch ring is detected by the disengagement detecting portion at a time of shifting operation, the control apparatus starts a shift-related control for engaging the dog clutch mechanism which is engaged at the time of shifting operation.

2. The dog clutch control apparatus according to claim 1, wherein the shift-related control includes an engine torque control for controlling a rotational torque of an engine which drives a wheel of a vehicle and a clutch torque control for controlling a transfer torque of a clutch.

3. The dog clutch control apparatus according to claim 1, further comprising:
   a motor generator as a drive source which drives a wheel of a vehicle,
   wherein the shift-related control includes a motor torque control for preventing torque loss from occurring at the time of shifting operation.

4. The dog clutch control apparatus according to claim 3, wherein the motor torque control controls a rotational torque of the motor generator to be increased at the same time as a rotational torque of an engine decreases.

\* \* \* \* \*